United States Patent

Euzen et al.

[11] Patent Number: 5,833,936
[45] Date of Patent: Nov. 10, 1998

[54] VESSEL WITH IMPROVED SOLID PARTICLE EXTRACTION

[75] Inventors: Jean Paul Euzen, Dardilly; Renaud Pontier, Vienne; Daniel Vuillemot, Saint Genis Laval, all of France

[73] Assignee: Institut Francais du Petrole, Rueil-Malmaison, France

[21] Appl. No.: 642,000

[22] Filed: May 2, 1996

[30] Foreign Application Priority Data

May 2, 1995 [FR] France ................................. 95 05324

[51] Int. Cl.⁶ ............................. B01J 8/00; B01J 8/12
[52] U.S. Cl. ..................... 422/192; 422/191; 422/211; 422/216; 422/218; 422/219
[58] Field of Search ........................ 422/211, 145, 422/233, 191, 192, 216, 218, 219

[56] References Cited

U.S. PATENT DOCUMENTS

| 4,277,444 | 7/1981 | van Landeghem | 422/191 |
| 4,769,219 | 9/1988 | Tasker et al. | 422/144 |

FOREIGN PATENT DOCUMENTS

| 1130249 | 9/1956 | France . |
| 1180648 | 1/1959 | France . |
| 2427378 | 5/1978 | France . |
| 768235 | 7/1971 | Germany . |
| 90 14 347.7 | 10/1990 | Germany . |

OTHER PUBLICATIONS

Tramabouze, P., "Reactor Scaleup Methodology", Chem. Engin. Prog., 86 Feb. 1990, No. 2, pp. 23–31.

*Primary Examiner*—Hien Tran
*Attorney, Agent, or Firm*—Millen, White, Zelano, & Branigan, P.C.

[57] ABSTRACT

A vessel, in which a chemical reaction is carried out in the presence of a catalyst, comprises a bed (4) of solid catalytic particles, delimited by at least one wall (1, 10, 11) and a base (2). The base comprises at least one gravity extraction device (3) for the particles and a succession of ridges and hollows forming pleats. The ridges and hollows are oriented towards the extraction device. This succession is advantageously formed by an assembly of facets, which are preferably trapezoidal. The invention has particular application to mobile bed reactors, in particular those used for catalytic reforming of petroleum cuts.

15 Claims, 3 Drawing Sheets

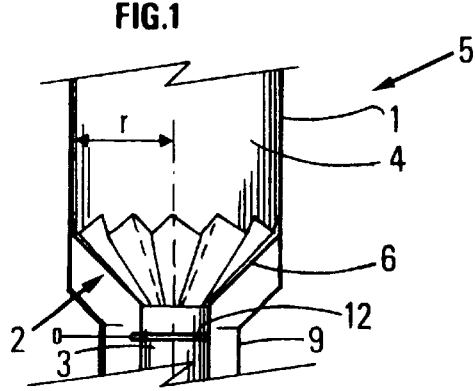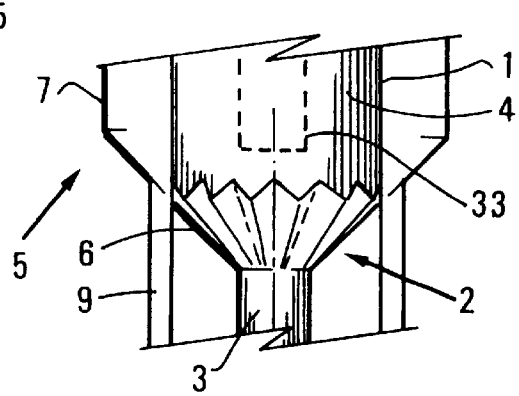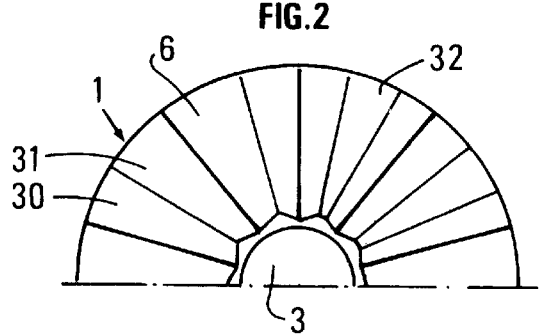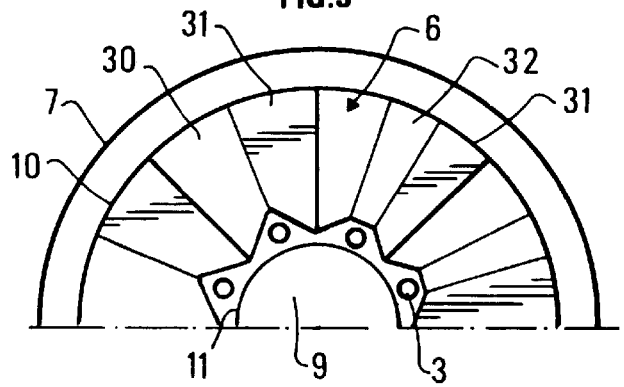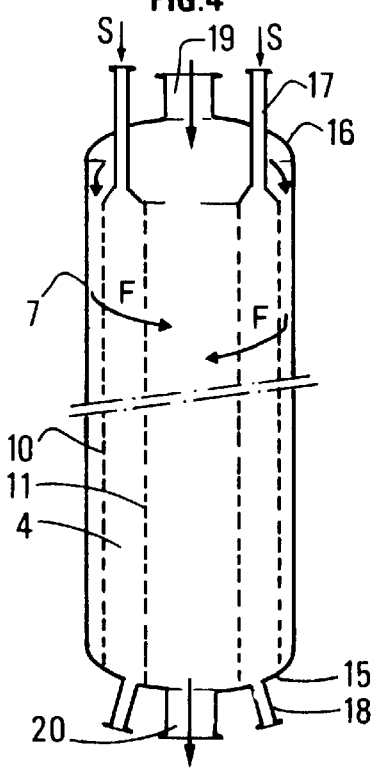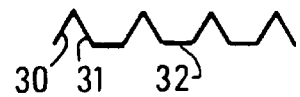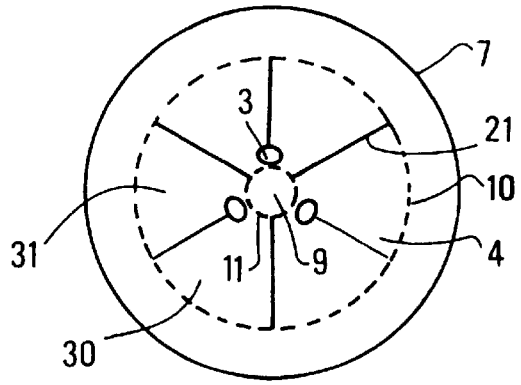

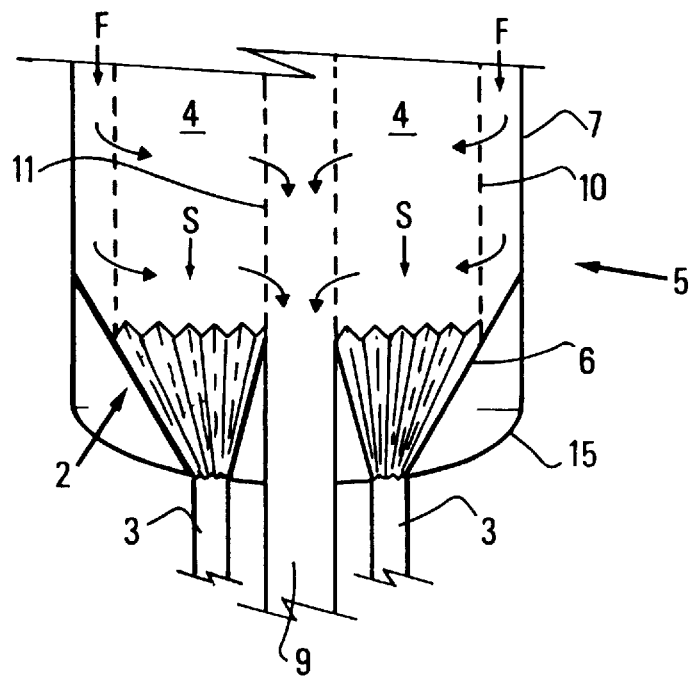
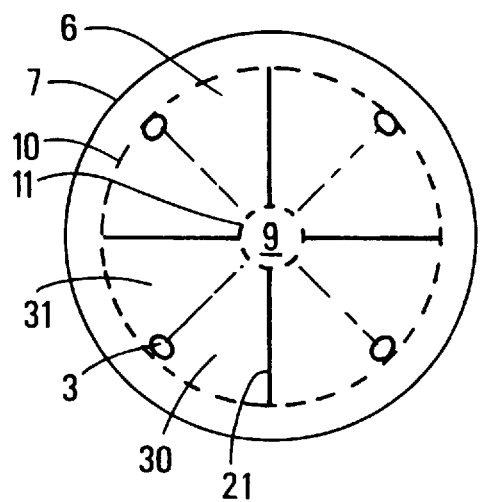

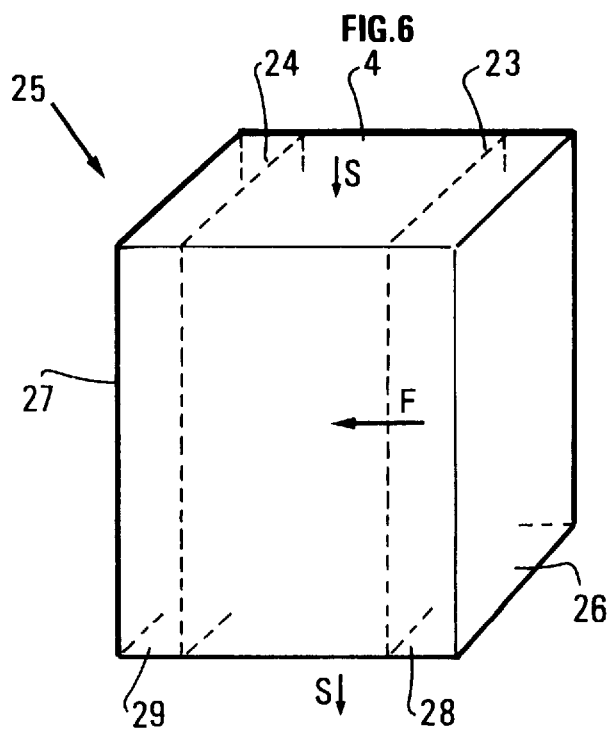
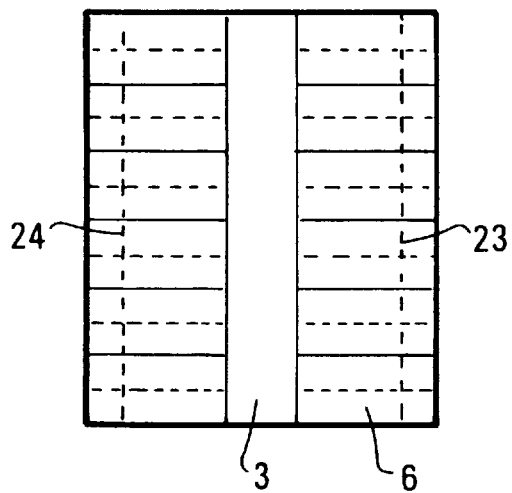
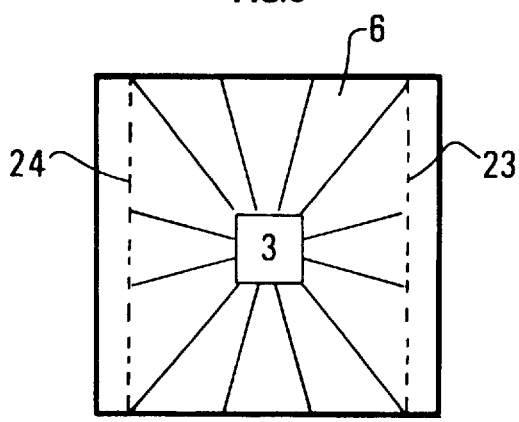

VESSEL WITH IMPROVED SOLID
PARTICLE EXTRACTION

The present invention concerns a vessel in which a chemical reaction is carried out in the presence of a catalyst and which comprises at least one bed of solid catalytic particles wherein flow of particles towards the extraction means is facilitated by the presence of a succession of ridges and hollows forming pleats.

The present invention advantageously concerns reactors containing catalytic particles, in particular reactors in which the catalyst circulates in the form of a mobile bed, in particular an annular mobile bed. This is particularly common in catalytic reforming processes.

In mobile bed units in which the solid (which may or may not be a catalyst, and may or may not be spherical) circulates as a dense bed flowing vertically under gravity. The walls which limit the granular zone normally comprise two cylindrical screens with differing diameters. The fluid, as a liquid or more often as a gas, or possibly fluids (gas and liquid, or liquid and another non-miscible liquid) passes through the granular bed (in the annular case) as a cross-current, i.e., radially from outside to inside, or from inside to outside. After passing through the cylindrical inlet screen, the fluid passes through the bed, then leaves the annular space containing the granular medium by passing through a second screen, the outlet screen, which is concentric with the inlet screen.

The solid catalytic particles, which may or may not be spherical, are introduced to the upper portion of the mobile bed, then descend in the space delimited by the walls or lateral screens, and are then extracted from the lower portion of the mobile bed.

Regular flow of the particles from the base of a mobile bed reactor is a major problem as it is difficult to control.

It is important that the particles which pass through the reactor are all discharged from it after a substantially identical residence time, no earlier or later than other particles, so that they all behave analogously and their use in the unit can be optimized.

It is, however, difficult to extract all the particles after the same residence time since the particles have different paths, in particular at the base of the mobile bed. The cross section through which the catalyst moves changes abruptly between the zone corresponding to the annular space and the zone corresponding to the sum total of the extraction lines. This very rapid change in cross section causes large relative movements between the particles and results in a wide distribution in the average flow rates of these particles.

Dead zones exist at the base of the reactor, where the particles only move a little or not at all and which are thus practically useless for catalysis and also deleterious to the regular flow of other particles since they have a contact surface and hence a relatively irregular friction surface. They are thus not as effective as a smooth wall for good flow.

The aim of the invention is to modify the direction and intensity of the stresses on the particles at the base of the bed to facilitate and regularize the relative movements between these particles.

In order to overcome this problem of extraction of catalytic particles, the invention provides a particular structure at the base of the bed contained in the vessel.

More precisely, the invention provides a vessel in which a chemical reaction is carried out in the presence of a catalyst and which comprises a bed of solid catalytic particles, delimited for flow by at least one wall and a base, the base comprising at least one gravity extraction means for the particles, the vessel also comprising, on its base in contact with the particles, a succession of ridges and hollows forming pleats, the ridges and hollows being arranged in directions which are directed towards the extraction means.

BRIEF DESCRIPTION OF THE DRAWINGS

The invention will be better understood by referring to the following Figures:

FIG. 1: vessel with pleated base and extraction means;

FIG. 2: half top view of base of FIG. 1;

FIGS. 2A and 2B: sections of facets of the pleated base;

FIG. 3: half top view of a vessel comprising 2 cylindrical walls delimiting the bed;

FIG. 4: mobile bed reactor;

FIGS. 4A, 4B and 4C: embodiments where the bed is traversed radially by a fluid;

FIG. 5: partitioning of the bed into sectors;

FIG. 6: parallelepipedal reactor;

FIGS. 7 and 8: two embodiments of the base of a bed in a parallelepipedal vessel.

DETAILED DESCRIPTION OF THE DRAWINGS

FIG. 1 shows a cylindrical wall (1) delimiting a bed (4) of solid particles, the wall also being the wall of the vessel (5). The bed comprises a base (2) defined here by a conical wall (6) opening at the vertex of the cone into a single extraction means (3) located on the axis of the bed.

At least the internal face of wall (6) which is in contact with the particles is provided with a succession of ridges and hollows which form pleats. It is clear from FIG. 1 that the ridges and hollows have a direction ("fold") which is oriented towards the extraction means (3) and in addition is inclined to the horizontal to allow directed gravitational flow of the particles.

The extraction means (3) is constituted here by a cylindrical tube with the same axis as the wall (1).

FIG. 2 shows a half top view of FIG. 1, with the reference numbers (12 and 9) of the vessel removed for clarity. A description of these reference numbers will be given below.

In all the embodiments shown here, and generally for the invention, the succession of ridges and hollows is formed by assembling square, rectangular, trapezoidal or substantially trapezoidal facets, or facets in the form of a parallelogram (see FIGS. 2 and 3), thus forming edges.

In the case of facets (30, 31) which are substantially trapezoidal or trapezoidal used for annular (or circular) cross sectioned beds, as shown in FIGS. 3 and 2, they have the following:

a small base close to the extraction means (3) close to the central collector or, more generally, to the axis or plane of symmetry, which is substantially horizontal and approximately rectilinear;

a large base close to the periphery of the bed and, for example as shown in FIG. 3, to the outer screen (10) at the periphery of the bed, which is elliptical or approximately rectilinear in form, joined to the outer screen, and inclined to the horizontal;

a side which extends from the outer screen towards the inner screen in FIG. 3, connecting the upper extremity of the large base described above to the most central end of the small base.

a side which extends from the outer screen towards the inner screen in FIG. 3, connecting the lower extremity of the large base described above to the least central extremity of the small base.

The assembly described thus has a succession of facets which are inclined towards the solid extraction means (or towards the central collector) and which are oriented alternately forwards (full line in the Figures) or rearwards (light line in the Figures) with respect to a reference direction of rotation about the axis of the reactor (vessel or bed).

FIG. 2A shows a cross section of facets (30, 31). The edge formed by two adjacent facets, which is a ridge, may be sharp or slightly truncated or rounded, but never becomes a large flattened surface which would create a stationary particle zone which would be deleterious to their flow, in particular for a mobile bed.

In a variation, a series of small supplementary facets termed medial facets which are trapezoidal in form (reference numeral 32) are placed between the facets described above (reference numerals 30 and 31) where they intersect transversely, the two bases thus being substantially horizontal. These facets thus flatten the hollows previously formed by the series of facets with reference numerals 30 and 31.

Thus, at least one hollow has at least one medial facet located therein.

A cross section is shown in FIG. 2B.

The material and surface of the facets is, of course, selected to reduce frictional forces and facilitate particle flow.

Changing the shape of the base of the bed to transform it into a succession of ridges and hollows converging towards the axis of symmetry of the bed and/or the extraction means has the following effects:

some of the particles come into contact with a rigid wall far sooner than in a conventional arrangement, which gradually orients their path towards the axis of symmetry of the bed and/or the extraction means and also towards the sides (lateral direction). The area open to the particles in a horizontal plane thus changes more gradually;

orientation of the facets in partially lateral (or transverse) directions with respect to radial directions can reduce the radial component of the stresses acting on the particles and thus the vertical component becomes more important. The particle bed is thus more loosely packed and hence has better fluidity or deformability, encouraging regular and uniform particle flow, the facets which are inclined to the horizontal, preferably at angles which are greater than the natural angle of incline of the particles against the wall, reduce the volume of the dead zones and can even completely eliminate them, reducing peripheral frictional forces and again facilitating regular and uniform particle flow at the base of the bed;

the medial facets attenuate the sharp angle formed by the lateral facets at the bottom of the hollows and thus reduce lateral frictional forces which, in these zones in particular, can cause some particles to stick, resulting in the formation of bridges or arches which are of varying stability.

The surface which is in contact with the flowing particles is preferably smooth, in other words not perforated, or the surface may include a limited number of openings provided with a screen, for example for injection of (small quantities of) gas to aid in evacuating the particles.

The invention can be used in different vessel configurations. As an example, the bed in the vessel can be mobile (as illustrated in FIG. 4 onward) or fixed. In the latter case, the bed can rest on a horizontal wall (screen located above the base (2) provided with tubing each comprising a removable obstruction means, the pleated base being important when the bed flows when it is discharged via the base (as described in European patent application EP-A-0 562 913). The fixed bed can also rest on the pleated base (2) and is held in place by an obstruction means (12) located over each extraction means (3) and movable so that it can retract to allow the solid to flow. Advantageously, one of the means described in EP-A-0 562 913 is used.

In a further configuration, the solid particle bed is traversed by at least one fluid. In FIG. 1, this fluid flows axially through the bed and is separated from the solid by means of conical wall (6) which in this case is fluid-permeable (for example a screen). The fluid flows into the space delimited between the wall (6) and wall (1) prolonged beyond base (2), towards a fluid collection line (9).

In contrast, the fluid can traverse the bed in a direction which is quite different to that of the gravitational flow of the solid particles.

This type of disposition is en countered i n catalytic reforming reactors in which the mobile bed of catalytic particles passes through the vessel in a downward flow. A reactor of this type is shown in FIG. 4.

The reactor or vessel comprises a cylindrical wall (7), a base (15), a roof (16), an outer cylindrical screen(10) aligned with the axis of the reactor and an inner cylindrical screen (11), which is concentric with screen (10) but with a smaller diameter.

Solid particles S are introduced via at least one opening (17) in the roof and leave through the base of the vessel via at least one opening (18), the mobile particle bed circulating between the 2 screens.

Fluid F is introduced via at least one opening (19) in the top portion of the reactor, passes through t he bed and is collected in the inner volume delimited by screen (11) and leaves the reactor via at least one opening (20) in the bottom portion of the reactor. The fluid passes through the bed in a direction which is completely different to t hat of the particle flow.

In this Figure, the opening(s) for introducing and discharging the fluid is (are) positioned to allow the fluid to circulate in the annular space delimited by the wall of the vessel and the outer screen 10 with the larger diameter towards the inner volume delimited by the screen 11 with the smaller diameter, from which it leaves. The fluid can also be circulated in the opposite direction.

In order to improve the mechanical strength of the bed, it is of particular advantage to divide the bed into sectors by means of one or more walls (partitions) which may be solid or be screens.

These continuous walls (partitions) are fixed to the inner and outer screens and to the base, and thus contribute to the mechanical strength of the assembly. They are located parallel to the solid flow and do not oppose the main flow of the fluid. As an example, they can be arranged radially in a cylindrical vessel.

It is clear that these walls (partitions) must have the necessary surface characteristics for the solid particles to be able to slide along these walls. Further, each sector can be supplied independently of the other sectors, if required, and the solid can be independently extracted. In this case, at least one extraction means (3) must be provided for each sector.

These walls (partitions) can be fluid-tight and solid-tight or may be non permeable to solids but permeable to fluids.

FIG. 5 shows an incomplete top view of a cylindrical reactor (such as that shown in FIG. 4) with partitions (21).

This advantageous arrangement also improves the mechanical strength of the "pleated" base.

FIGS. 4A and 4B show more detailed views of a mobile particle bed.

In FIG. 4A, the fluid(s) circulate from the periphery of the bed (fluid inlet screen or outer screen 10) towards the center (fluid outlet screen or inner screen wall 11) and the fluid leaves the vessel via central collector (9). The bed rests on a pleated base (2) which is separate from the base (15) of the vessel and the particles flow into a plurality of extraction means (3) which can then be united to form a single evacuation line for the solid.

It should be noted that this embodiment can also work with a fixed bed held by a screen or an obstruction means placed over the extraction means, as described above.

FIG. 4B shows a vessel in which the fluid circulates in the reverse direction, the fluid entering the bed via a diffuser (33) for example, arranged along practically the whole length of the bed axis, and fluid leaving via a wall (1) which is permeable to fluid being collected at the periphery of the bed then being discharged from the vessel via one or more lines (9).

FIG. 4C shows a top view of the base of a reactor in which the bed is delimited by two concentric walls (10) and (11), a fluid traversing it from space (9) where the fluid is introduced, towards the periphery, leaving via outer screen (10) and being collected between the walls (7) of the vessel and screen (10). Extraction means (3) are located close to the screen (10) and are advantageously positioned at distances which are defined below.

It should be noted that in the case of FIG. 4C, the vertex of conical wall (6) is directed upwardly, and opens into line (9) and the cone opens out towards the extract means (3).

In all the above embodiments, when the bed is located in a volume with an annular cross section, it can be extracted by means of a plurality (at least 2) of lines constituting extraction means, located at the base of the bed and advantageously at a specific position.

The directions of the ridges and hollows must be inclined and we have established that the flow is facilitated when the extraction means (3) are not located too close to the periphery of the bed section. The maximum radial distance between the axis of the extraction means and the outer wall of the bed acting as the fluid outlet is less than or equal to 0.75e, where e is the radial distance between the two inner and outer lateral walls e.g., screens 10 and 11) of the bed, i.e., the difference between the respective radii of these walls. A preferred distance is less than or equal to 0.5e, if possible less than or equal to 0.3e.

FIG. 3 shows a top view of a vessel in which the bed of solid particles circulates in a volume with an annular cross section delimited by 2 cylindrical walls (screens 10, 11) which are concentric and with the same axis. The base of the bed comprises at least one particle extraction means (3); a plurality of means are shown here, positioned perpendicular to the annular cross section. The distance between the axis of each of the means (3) and the fluid outlet wall is at most 0.75e, e always representing the radial distance between the two inner and outer lateral walls of the bed. For the reasons given above, the preferred distance is at most 0.5e, more advantageously at most 0.3e.

All these embodiments show extraction means (3) using lines, tubes, etc., with a circular cross section. Lines, tubes, etc., with an elliptical cross section would also be suitable. Other embodiments can also be envisaged without departing from the scope of the invention, but the sum of the cross sectional surfaces of the extraction means at the base of the bed must be less than the surface area of the lower cross section of the bed.

In the same way, the bed can be located in the elliptical or quasi elliptical cross section delimited between 2 walls located on the same axis of symmetry, the base of the bed thus comprising at least one extraction means (3) and the maximum radial distance between the axis of the extraction means and the wall of the bed through which the fluid is discharged being less than or equal to 0.75e, being the radial distance between the two laterally inner and outer walls of the bed, preferably at most 0.5e and more advantageously at most 0.3e.

FIG. 6 shows a cross section of a parallelepipedal compartment (25) with walls (26) and (27) comprising 2 planar parallel screens (23) and (24) between which mobile bed (4) circulates in a vertical direction; fluid F flows perpendicular to S in the space (28) delimited by wall (26) and screen (23), traverses bed (4) and is collected in the space (29) between the wall (27) and screen (24), from which it is discharged.

Bed (4) is thus located in the parallelepipedal volume delimited by four walls.

The base of the bed shown in FIG. 7 comprises a single extraction means (3) whose axis is located along a plane of symmetry of the parallelepiped. More generally, the base of the bed comprises at least one extraction means. With the parallel screens shown here, these means (3) is/are located between the 2 screens, at the base of the bed. It (they) can also be against one of the screens, since the pleats are in one direction only.

As described above, the pleats can be arranged symmetrically, in this case along the four walls as shown in FIG. 8. The bed can also be fixed between walls (23, 24) and the four other perpendicular walls.

The invention is of particular application to moving solid particle beds, for example with motion which is temporary (extraction of fixed beds, for example) and especially when the movement is permanent (mobile beds). The invention can be more generally applied to downward flow of solid particles where the cross section is reducing.

The invention is particularly applicable to solid particles with an average size in the range 0.1 to 6 mm, preferably in the range 1.5 to 3.5 mm, more preferably in the range 1.5 to 3.2 mm. The particles are generally spherical but any other form may be suitable, in particular cylindrical or pseudo-cylindrical particles such as extruded catalytic particles.

The application is particularly suitable to mobile bed catalytic reactors, in particular for catalytic reforming.

We claim:

1. A vessel for performing a chemical reaction in the presence of a catalyst, said vessel comprising:

at least one reactor wall defining a spaced;

at least one mobile bed of solid catalytic particles positioned within the space defined by said at least one reactor wall wherein said bed is located within a volume of annular or elliptical cross section delaminated between a first fluid permeable internal wall and a second fluid permeable internal wall, the fluid permeable internal walls being arranged on the same axis of symmetry, wherein flow of said mobile bed is delimited by said two walls and a base, said base comprising at least one gravity extraction means for removal of said particles, said base further comprising, in contact with said particles, a succession of ridges and hollows forming pleats, said ridges and hollows being oriented towards said extraction means, said vessel further comprising means in the top portion of said vessel for introducing a fluid and means in the bottom portion of said vessel for removing a fluid, said means for introducing a fluid and means for removing fluid being positioned to permit fluid to be introduced into the vessel, pass through one of the fluid permeable internal walls, traverse the bed in a principal direction which is different than the overall flow direction of said particles, pass through the other fluid permeable n exit the vessel.

2. A vessel according to claim 1, wherein said succession of ridges and hollows is formed by an assembly of facets.

3. A vessel according to claim 2, wherein said the facets are square, rectangular, trapezoidal or substantially trapezoidal in shape, or are shaped as a parallelogram.

4. A vessel according to claim 2, wherein at least one facet is located in at least one hollow.

5. A vessel according to claim 1, wherein said extraction means is located at a radial position between the axis of said extraction means and the fluid permeable internal wall which acts as a fluid outlet for said mobile bed, wherein said radial position is less than or equal to 0.75e, being the radial distance between the two fluid permeable internal walls.

6. A vessel according to claim 5, where said radial position is at most 0.5e.

7. A vessel according to claim 5, wherein said radial position is at most 0.3e.

8. A vessel according to claim 1, wherein said bed rest on said base of the vessel.

9. A vessel according to claim 1, wherein said at least one extraction means is provided with an obstruction means.

10. A vessel according to claim 1 wherein further comprising at least one partition dividing said bed into sectors.

11. A vessel according to claim 1 wherein the average size of said particles is 0.1 to 6 mm.

12. A vessel according to claim 1 wherein the average size of said particles is 1.5 to 3.5 mm.

13. A vessel according to claim 10, wherein each of the sectors has at least one extraction means.

14. A vessel for performing a chemical reaction in the presence of a catalyst, said vessel comprising:

at least one reactor wall defining a space;

at least one bed of solid catalytic particles positioned within the space defined by said at least one reactor wall wherein said bed is located within a volume of annular or elliptical cross section deliminated between a first fluid permeable internal wall and a second fluid permeable internal wall, the fluid permeable internal walls being arranged on the same axis of symmetry, wherein flow of said mobile bed is delimited by said two walls and a base, said base comprising at least one gravity extraction means for removal of said particles, said base further comprising, in contact with said particles, a succession of ridges and hollows forming pleats, said ridges and hollows being oriented towards said extraction means, said vessel further comprising at least one partition dividing said bed into sectors, wherein the partitions dividing the bed into sectors are fluid-tight.

15. A vessel for performing a chemical reaction in the presence of a catalyst, said vessel comprising:

at least one reactor wall defining a space;

at least one mobile bed of solid catalytic particles positioned within the space defined by said at least one reactor wall wherein said bed is located within a volume of annular or elliptical cross section deliminated between a first fluid permeable internal wall and a second fluid permeable internal wall, the fluid permeable internal walls being arranged on the same axis of symmetry, wherein flow of said mobile bed is delimited by is said two wall base, said base comprising at least one gravity extraction means for removal of said particles, said base further comprising, in contact with said particles, a succession of ridges and hollows forming pleats, said ridges and hollows being oriented towards said extraction means, at least one partitioned or dividing said beds into sectors, wherein the partitions dividing the bed into sectors are nonpermeable to solids and permeable to fluids.

* * * * *